(12) United States Patent
Kudoh

(10) Patent No.: US 7,505,520 B2
(45) Date of Patent: Mar. 17, 2009

(54) COMMUNICATION SYSTEM BETWEEN INTEGRATED CIRCUIT DEVICES FOR PROPAGATING DATA IN SERIAL

(75) Inventor: Yoshiharu Kudoh, Tokyo (JP)

(73) Assignee: NEC Corporation, Tokyo (JP)

( * ) Notice: Subject to any disclaimer, the term of this patent is extended or adjusted under 35 U.S.C. 154(b) by 977 days.

(21) Appl. No.: 10/336,521

(22) Filed: Jan. 3, 2003

(65) Prior Publication Data
US 2003/0128767 A1 Jul. 10, 2003

(30) Foreign Application Priority Data
Jan. 7, 2002 (JP) ............................. 2002-000329

(51) Int. Cl.
*H04B 3/00* (2006.01)
(52) U.S. Cl. ...................................... 375/257; 375/288
(58) Field of Classification Search ................. 375/257, 375/219, 220, 222, 229, 231, 232; 370/276, 370/231; 333/18
See application file for complete search history.

(56) References Cited

U.S. PATENT DOCUMENTS

| | | | | |
|---|---|---|---|---|
| 3,745,261 A | * | 7/1973 | Friedman | 379/394 |
| 4,044,307 A | * | 8/1977 | Borysiewicz et al. | 379/93.32 |
| 4,201,959 A | * | 5/1980 | Niiro et al. | 333/16 |
| 4,868,850 A | * | 9/1989 | Kaku et al. | 375/231 |
| 4,995,057 A | * | 2/1991 | Chung | 375/231 |
| 5,077,742 A | * | 12/1991 | Tsumura et al. | 714/748 |
| 5,153,527 A | * | 10/1992 | Yaguchi | 329/307 |
| 5,253,249 A | * | 10/1993 | Fitzgerald et al. | 370/276 |
| 5,579,336 A | * | 11/1996 | Fitzgerald et al. | 375/219 |
| 5,930,296 A | * | 7/1999 | Kot | 375/233 |
| 6,097,767 A | * | 8/2000 | Lo et al. | 375/327 |
| 6,188,279 B1 | * | 2/2001 | Yuen et al. | 330/149 |
| 6,317,494 B1 | * | 11/2001 | French et al. | 379/399.01 |
| 6,400,761 B1 | * | 6/2002 | Smee et al. | 375/232 |
| 6,794,900 B2 | * | 9/2004 | Tang et al. | 326/86 |
| 6,879,639 B1 | * | 4/2005 | Verbin et al. | 375/285 |
| 2002/0044598 A1 | * | 4/2002 | Frenkel et al. | 375/232 |

FOREIGN PATENT DOCUMENTS

| | | |
|---|---|---|
| JP | H01-157112 | 6/1989 |
| JP | H04-54733 | 2/1992 |
| JP | H04-267634 | 9/1992 |
| JP | H05-244037 | 9/1993 |

* cited by examiner

*Primary Examiner*—Emmanuel Bayard
(74) *Attorney, Agent, or Firm*—Scully, Scott, Murphy & Presser, P.C.

(57) ABSTRACT

A semiconductor integrated circuit device serving as a signal source, another semiconductor integrated circuit device serving as a destination and a transmission line form in combination a communication system; the transmission line is connected between a transmitting circuit of the semiconductor integrated circuit device and a receiving circuit of the other semiconductor integrated circuit device; equalizers are incorporated in the transmitting circuit and receiving circuit, respectively, so that the equalizer of the receiving circuit is not expected to exhibit a large amplification factor to the high frequency signal components; this results in that the received signal is restored to a waveform close to the original waveform.

6 Claims, 13 Drawing Sheets

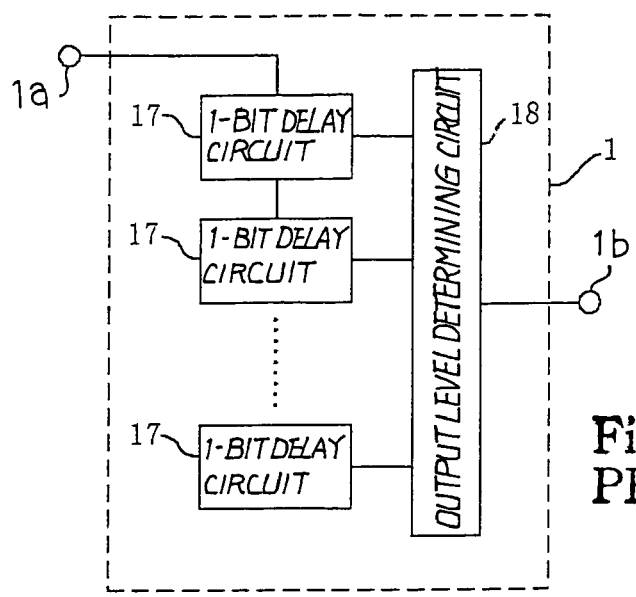
Fig. 2
PRIOR ART
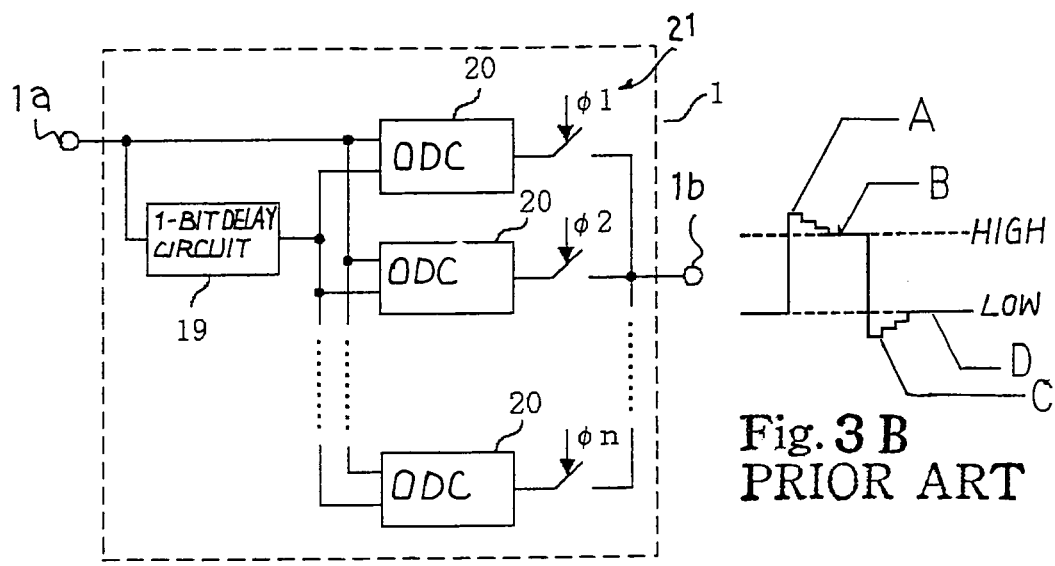
Fig. 3A
PRIOR ART
Fig. 3B
PRIOR ART
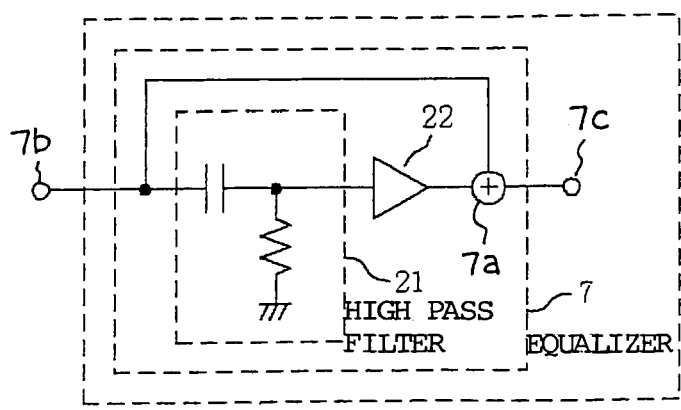
Fig. 4
PRIOR ART

COMMUNICATION SYSTEM BETWEEN INTEGRATED CIRCUIT DEVICES FOR PROPAGATING DATA IN SERIAL

FIELD OF THE INVENTION

This invention relates to a communication technology and, more particularly, to a communication system between integrated circuit devices for propagating data in serial.

DESCRIPTION OF THE RELATED ART

When data is transferred from an integrated circuit to another integrated circuit, the data is converted from the digital signal to an analog signal, and the analog signal is transferred from the integrated circuit to the other integrated circuit. The analog signal is converted to a digital signal, again, and the digital signal is processed in the other integrated circuit.

The amount of data to be transmitted has gotten more and more. In case where the data is propagated through a propagation path consisting of plural signal transmission lines, the amount of data propagated through the propagation path reaches a limit, because the skew becomes serious. The transmission characteristics are different among the plural signal lines so that the plural signal lines have respective influences, which are different from one another, on the signals transmitted through the individual transmission signal lines. This means that the time lag is different depending upon the transmission characteristics. When a large amount of data is transmitted between the integrated circuit devices at a high transmission rate, the signals are liable to be out of the synchronism. This is the serious problem in the parallel data transmission.

On the other hand, in case where a large amount of data is transmitted through a single signal transmission line. The data transmission is free from the skew, and the data transmission rate gets higher and higher. However, the band to be required for the data transmission also gets high. The band which a signal transmission line can offer sets a limit on the amount of data transmitted through the single signal transmission line. If a signal is transmitted in an improper band through a signal transmission line, the signal is deformed so that a part of the data to be propagated is lost. A pulse signal consists of a wide variety of signal components different in frequency. The higher the frequency, the more serious the attenuation. While the pulse signal is being transmitted through the signal transmission line, the high signal components are seriously attenuated so that the pulse signal is deformed, and the part of the data is lost.

The technology which makes the voltage amplification/voltage attenuation constant among the signal components in different bands is called "equalization". The equalization technology has been employed in the signal transmission between integrated circuit devices. A transmitter is provided in one of the integrated circuit devices, and a receiver is provided in the other integrated circuit device. Conventionally, the equalizer is employed in either transmitter or receiver.

FIG. 1A is a circuit diagram showing the circuit configuration of the prior art equalizer incorporated in a semiconductor integrated circuit device 100. The semiconductor integrated circuit device 100 includes a transmitter 1, and the equalizer is incorporated in the transmitter 1. The transmitter 1 is very simple, and has a buffer circuit 14. A signal input node 1a is connected to the input node of the buffer circuit 14, and the output node of the buffer circuit 14 is connected to an output terminal 1b. A one-bit delay circuit 15 and an inverter circuit 16 form in combination the prior art equalizer. The one-bit delay circuit 15 and inverter circuit 16 are connected in series between the input node 1a and the output terminal 1b.

A digital signal is supplied to the input node 1a. The digital signal is supplied from the input node 1a to the buffer circuit 14 and the one-bit delay circuit 15 in parallel. The digital signal is temporarily stored in the buffer circuit 14. The one-bit delay circuit 15 is implemented by a shift register. The digital signal is one-bit delayed in the delay circuit 15, and is temporarily stored in the inverter circuit 16. When the second bit is stored in the buffer circuit 14, the first bit reaches the buffer circuit 16, and the first bit is added to the second bit at a certain ratio. This results in the waveform shown in FIG. 1B. The output signal shown in FIG. 1B has four different potential levels A, B, C and D in the waveform. The potential levels B and D are recognized as the high level and low level, respectively. However, the potential level A exceeds the high level, and potential level C is below the low level. When the second bit is opposite in logic to the first bit, the second bit is inverted and the inverted second bit, which is same in logic level to the first bit, is added to the first bit. As a result, the potential level A or C is higher or lower than the high level or the lower level. This means that the high frequency signal components are increased rather than the low frequency signal components.

Another prior art equalizer is shown in FIG. 2, and is also incorporated in a prior art transmitter 1. The transmitter 1 includes the prior art equalizer, and plural one-bit delay circuits 17 are connected in parallel to an output level determining circuit 18. A shift register serves as the plural one-bit delay circuits 17. The inter symbol interference takes place not only between a bit and the previous bit but also with bits already transmitted prior to the previous bit. The prior art equalizer is designed against the inter symbol interference between a bit and these bits already transmitted.

While a bit string is being supplied to the transmitter 1, and each bit is sequentially conveyed from the one-bit delay circuit 17 to the next one, and the one-bit delay circuits 17 reports the logic level of the bit string to the output level determining circuit 18. The output level determining circuit 18 checks the bits presently stored in the one-bit delay circuits 17 to see how frequently the bit string changes the logic level, and determines the potential level of the output signal depending upon the frequency in change of the logic level. The higher the frequency, the higher the potential level.

Yet another prior art equalizer is shown in FIG. 3A, and is also incorporated in a transmitter 1. The prior art equalizer includes a one-bit delay circut 19, plural output level determining circuits 20 and a switching circuit 21. The output level determining circuits 20 are abbreviated as "ODC" in FIG. 3A. The input node 1a is connected to the input node of the one-bit delay circuit 19, and is further connected to the input nodes of the output level determining circuits 20. The output level determining circuits 20 are connected in parallel to the switching circuit 21, and the switching circuit 21 is responsive to clock signals phi-1, phi-2 . . . and phi-n so as to sequentially connect the output level determining circuits 20 to the output terminal 1b.

The output level determining circuits 20 compares the delayed bit, which is the output signal of the one-bit delay circuit 19, with the bit presently supplied to the input node 1a, and respectively produce output signals different in potential level. The switching circuit 21 sequentially connects the output level determining circuits 20 to the output terminal 1b.

The prior art equalizer changes the amplification factor in a frequency higher than the signal frequency, i.e., the bits per unit time so as to stepwise vary the potential level at the output terminal 1b in each pulse period as shown in FIG. 3B. When the logic level is changed from the previous bit to the presently supplied bit, the highest potential level is given to the output terminal 1b as labeled with "A". The potential level is stepwise decreased. The next bit is same in logic level as the bit so that the potential level at the output terminal 1b reaches the high level as labeled with "B".

When the logic level is changed from the previous bit to the presently supplied bit, the potential level at the output terminal 1b is widely dropped to the negative as labeled with "C". The potential level is stepwise changed. The next bit is same in logic level as the bit so that the potential level at the output terminal 1b reaches the low level as labeled with "D". In the prior art equalizer, a high frequency signal component over the signal frequency result in a wide amplitude of the output signal.

In a receiver, the waveform of a received signal is restored to the waveform of the original signal by means of an equalizer. The equalizer increases the amplification factor in a higher band.

FIG. 4 shows a prior art equalizer 7 incorporated in a receiver. The receiver forms a part of a semiconductor integrated circuit device 200. The prior art equalizer 7 includes a high pass filter 21, an amplifier 22 and an adder 7a. The high pass filter 21 and amplifier 22 are connected in series between the input node 7b and one input node of the adder 7a, and the input node 7b is further connected to the other input node of the adder 7a. The output node of the adder 7a is connected to the output node 7b.

A signal is propagated through a transmission line to the semiconductor integrated circuit device 200, and is supplied to the high pass filter 21 and the other input node of the adder 7a. The high frequency signal components are transferred to the amplifier 22, and are amplified. The high frequency signal components are added to the input signal for restoring the input signal to the original waveform before the transmission. The restored signal is supplied to a bit discriminating circuit (not shown) so that the original digital signal is obtained.

FIG. 5 shows the circuit configuration of the amplifier 22. The amplifier 22 includes an operational amplifier 25, an input resistor R1 and a feedback resistor R2. The input resistor R1 is connected between a signal input node and the inverted input node of the operational amplifier 25, and a reference voltage Vref is applied to the non-inverted input node of the operational amplifier 25. The feedback resistor R2 is connected between the output node and the inverted input node.

The operational amplifier 25 includes a differential amplifier shown in FIG. 6. The differential amplifier includes a series combination of a p-channel enhancement type field effect transistor Q11 and an n-channel enhancement type field effect transistor Q13, another series combination of a p-channel enhancement type field effect transistor Q12 and an n-channel enhancement type field effect transistor Q14 and a constant current source 26. The series combinations Q11/Q13 and Q12/Q14 are connected in parallel between a positive power voltage line and the constant current source 26, and the constant current source 26 is connected between the source nodes of the n-channel enhancement type field effect transistors Q13/Q14 and the ground.

The gate electrodes of the p-channel enhancement type field effect transistors Q11/Q12 are connected to the drain node of the p-channel enhancement type field effect transistor Q12 so that the p-channel enhancement type field effect transistors Q11/Q12 serve as a load. The reference voltage Vref is applied to the gate electrode of the n-channel enhancement type field effect transistor Q14, and the signal to be amplified is applied to the gate electrode of the n-channel enhancement type field effect transistor Q13. The amplified signal is taken out from the drain node of the n-channel enhancement type field effect transistor Q13. If the operational amplifier 25 amplified all the signal components without any limit, the received signal would be ideally restored to the original waveform. However, the operational amplifier 25 merely amplifies the signal components in a certain band. The high frequency signal components over the certain band are not amplified, and it is difficult ideally to restore the received signal to the original waveform transmitted at a high transmission rate.

In order to make the waveform close to the original waveform, a high-speed sampling technology has been proposed. FIG. 7 shows the circuit configuration of a prior art circuit in which the high-speed sampling technology is employed. An input node 7b is connected to the input nodes of plural sample-and-hold circuits 23, and the sample-and-hold circuits 23 are selectively connected to judging circuits 24. The input signal is sampled at different timings by the sample-and-hold circuits 23, and the discrete values are supplied to the judging circuits 24. Each judging circuit compares the discrete value supplied from the associated sample-and-hold circuit 23 with the discrete value supplied from the adjacent sample-and-hold circuit 23 so as to determine the value of a digital signal. An output signal is determined on the basis of the digital signals. Since the detectors are sequentially activated, the period for the detection is prolonged, and the time required for the operation/ amplification is obtained.

Conductive strips on a printed circuit board and a cable offer the signal transmission lines between the semiconductor integrated circuit devices. When signals are transmitted through a cable, the user selects the cable, and it is impossible that the manufacturer optimizes the transmission lines between the semiconductor integrated circuit devices. In this situation, research and development efforts are being made on adaptive equalizing circuit technologies for the restoration on the receiver side. The adaptive equalizing circuit technologies are expected to cope with a wide variety of transmission lines different in attenuation through an automatic adoption of the circuit characteristics. If the ideal amplification were achieved, the received signal would be exactly restored to the original waveform for reducing the misjudged bits.

A problem is encountered in the prior art equalizers incorporated in the transmitters in that the output amplitude of the low frequency signal component is narrower than the potential difference between the power voltages. This is because of the fact that the equalization is achieved on the condition that the maximum output voltage is lower than the power voltage. The circuit components have been scaled down on the semiconductor devices, and the circuits are expected to operate at a higher speed. This means that the equalized signal has a narrow amplitude. A substantial amount of margin is required for determining the logic level of the bits, and noise is unavoidably introduced into the equalized signal. For this reason, it is impossible to reduce the amplitude of the equalized signal below a certain value. In this situation, when the power voltage is lowered, the amount of attenuation allowed is reduced. However, the amount of attenuation along the transmission line is increased together with the data transmission rate. For this reason, when the power voltage is lowered, the data transmission at an extremely high speed and the long distance data transmission become impossible.

Another problem inherent in the prior art equalizer for the transmitter is the difficulty that the amount of attenuation along a transmission line is hardly presumed on the transmitter side. If the transmission line is different in characteristics from the transmission line assumed in the design work, the prior art equalizer can not automatically adapt the circuit characteristics to the transmission line, and a phase difference takes place.

When the equalizer transmits the signal along the transmission line with the designed characteristics, the waveform changed from the high dc voltage level to the low dc voltage level crosses the waveform from the low dc voltage level to the high dc voltage level at the mid point as shown in FIG. 8A. If the amplification is poor, the waveform, which stays at the high dc voltage level for a certain time period, does not reach the low dc voltage level, and the waveform, which stays at the low dc voltage level for a certain time period, also does not reach the high dc voltage level as shown in FIG. 8B. As a result, the waveforms do not cross at the mid point. In other words, the crossing points are offset from the mid point, and the margin in the judgment of the logic level is reduced. If the signal is excessively amplified, the waveform, which stays at the high dc voltage level for a certain time period, runs over the low dc voltage level, and the waveform, which stays at the low dc voltage level for a certain time period, also runs over the high dc voltage level as shown in FIG. 8C. This results in the reduction of the margin in the judgment of the logic level.

The prior art equalizer incorporated in the receiver can check up the frequency characteristics along the transmission line. This means that the prior art equalizer can adapt the circuit characteristics to the transmission line in such a manner as to compensate the attenuation along the transmission line. However, the amplifier incorporated in the prior art equalizer sets a limit on the high frequency signal components to be appropriately amplified. This means that the received signal, which has already passed through the high frequency band pass filter, is incompletely amplified by the amplifier.

Another problem inherent in the prior art equalizer for the receiver is the phase difference between the high frequency signal components and the received signal at the addition. The phase difference is an obstacle against the speed-up. Especially, in case where the amplification factor is large, the phase difference becomes serious. It is difficult to increase the amplification factor to the high frequency signal components. Thus, the prior art equalizer can not respond to a high-speed data transmission.

The prior art equalizer equipped with the sample-and-hold circuits can not respond to a high-speed data transmission. The sample-and-hold circuit includes a switching transistor for transferring a part of the input signal and a condenser for accumulating the electric charge. The condenser holds the signal voltage at the change of the switching transistor from the on-state to the off-state. Parasitic capacitance is unavoidably coupled to the gate electrode of the switching transistor, and is not equal among the switching transistors. The signal firstly charges the parasitic capacitance, and, thereafter, the condenser. The difference in the amount of parasitic capacitance is causative of the timing at which the signal starts to charge the condenser. Moreover, the switching transistors have the on-resistance, which is different from one another, and the delay is dominated by the on-resistance and capacitance. If the condensers have the capacitance much larger than the parasitic capacitance, the difference may be ignored. However, the large condenser requires a long time for being charged, and the sample-and-hold circuits can not follow a high-frequency signal. There is a trade-off between the difference in time lag and the time for charging the condenser.

For this reason, the prior art equalizer equipped with the sample-and-hold circuits can not respond to the high-speed data transmission.

SUMMARY OF THE INVENTION

It is therefore an important object of the present invention to provide a communication system, which can compensate the attenuation characteristics of a transmission line regardless of the distance between devices and the data transmission rate.

The present inventor contemplated the problems inherent in the prior art equalizers, and notified that the equalizer for the transmitter and the equalizer for the receiver were available for solving the problems of the other equalizers. In detail, the equalizer incorporated in the transmitter could reduce the difference between the attenuation of the low frequency signal components and the attenuation of the high frequency signal components, and the load against the speed-up for the equalizer incorporated in the receiver. The sample-and-hold circuits were not required for the equalizer in the receiver. On the other hand, the equalizer incorporated in the receiver could assist the transmitter in the data transmission against a large amount of attenuation. Thus, the present inventor concluded that a communication system would achieve a high-speed data transmission by using an equalizer incorporated in the transmitter and an equalizer incorporated in the receiver.

To accomplish the object, the present invention proposes to compensate the attenuation along a transmission line with the equalization carried out by equalizers respectively incorporated in a transmitting circuit and a receiving circuit.

In accordance with one aspect of the present invention, there is provided a communication system comprising a first device including a circuitry for generating a first digital signal at a signal frequency and a transmitting circuit connected to the circuitry and having a first equalizer for producing a transmitting signal containing high frequency signal components over the signal frequency, a transmission line connected at one end thereof to the transmitting circuit for propagating the transmitting signal to the other end thereof and causing the high frequency signal components to be attenuated more seriously than a signal component at the signal frequency, and a second device including a receiving circuit having a second equalizer connected to the other end of the transmission line and amplifying at least the high frequency signal components for restoring the transmitting signal to a waveform close to an original waveform of the first digital signal and a judging circuit for producing a second digital signal from parts of the waveform.

BRIEF DESCRIPTION OF THE DRAWINGS

The features and advantages of the communication system will be more clearly understood from the following description taken in conjunction with the accompanying drawings, in which FIG. 2 is a circuit diagram showing the circuit configuration of another prior art equalizer for the transmitter, FIG. 3A is a circuit diagram showing the circuit configuration of yet another prior art equalizer for the transmitter, FIG. 3B is a diagram showing the waveform of the output signal of the prior art equalizer, FIG. 4 is a circuit diagram showing the circuit configuration of the prior art equalizer incorporated in the receiver.

DESCRIPTION OF THE PREFERRED EMBODIMENTS

First Embodiment

Figure 9:
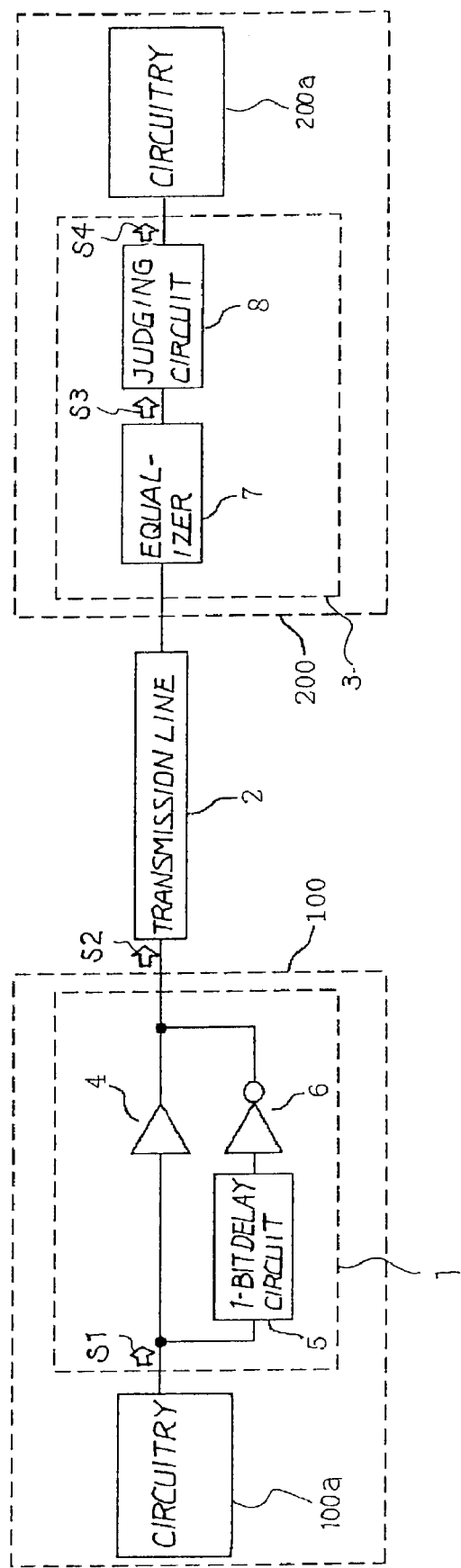
FIG. 9 is a block diagram showing the system configuration of a communication system according to the present invention.

Referring to FIG. 9 of the drawings, a communication system embodying the present invention largely comprises a semiconductor integrated circuit devices 100/200 and a transmission line 2. A transmitting circuit 1 and a circuitry 100a are integrated on a semiconductor chip, and form parts of the semiconductor integrated circuit device 100. Similarly, a receiving circuit 3 and a circuitry 200a are integrated on a semiconductor chip, and form parts of the semiconductor integrated circuit device 200. The transmission line 2 is connected between the transmitting circuit 1 and the receiving circuit 3, and serves as a serial data transmission line. A conductive strip on a printed circuit board or a cable serves as the transmission line 2.

The transmitting circuit 1 includes a buffer circuit 4, a one-bit delay circuit 5 and an inverter 6. The one-bit delay circuit 5 and inverter 6 form parts of an equalizer incorporated in the transmitting circuit 1. The one-bit delay circuit 5 is implemented by a shift register. The circuitry 100a processes a signal or signals for producing an output signal S1. The output signal S1 is supplied to the buffer circuit 4, and is temporarily stored therein. The output signal S1 is one-bit delayed through the one-bit delay circuit 5, and the delayed output signal is inverted by the inverter 6. The delayed inverted signal is added to the output signal, which is stored in the buffer circuit 4, at a predetermined ratio for producing a transmitting signal S2. Thus, the high-frequency signal components are firstly amplified, and the transmitting signal S2 is delivered to the transmitting line 2. The transmitting signal S2 is propagated through the transmission line 2 to the receiving circuit 3. While the transmitting signal S2 is being propagated through the transmission line 2, the high frequency signal components are attenuated more than the low frequency signal components are. The amplification factor for the high frequency signal components is to be smaller in value than the attenuation factor for the high frequency signal components along the transmission line 2, because the ratio of attenuation factor between the high frequency signal components and the low frequency signal component is relatively small at the end of the transmission line 2.

The receiving circuit 3 includes an equalizer 7 and a judging circuit 8. The equalizer 7 is same as the prior art equalizer shown in FIG. 4, by way of example. The equalizer 7 supplies an analog signal S3 to the judging circuit 8. The judging circuit 8 restores the analog signal S3 to a bit string, and supplies the bit string to the circuitry 200a as a digital signal S4. In this instance, an analog-to-digital converter serves as the judging circuit 8.

Figure 10:
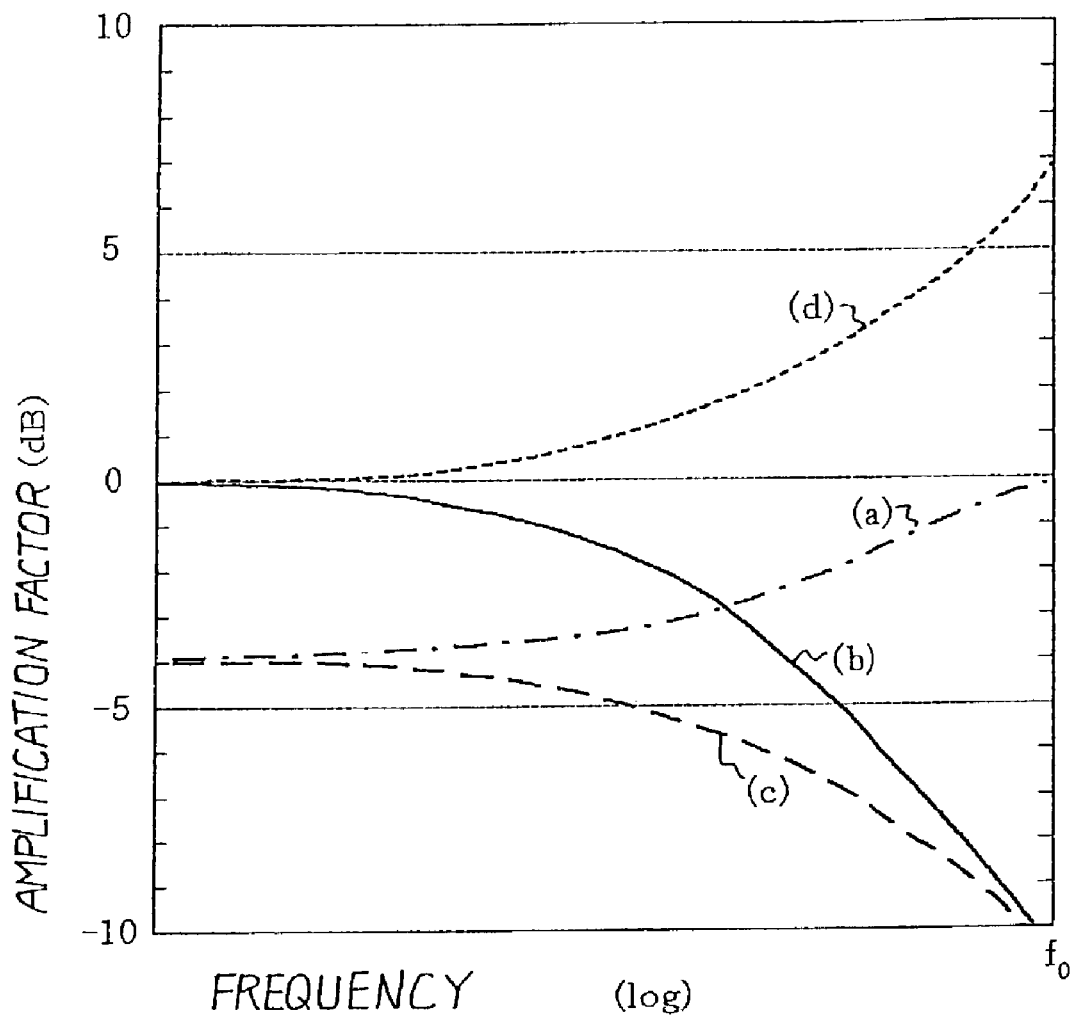
FIG. 10 is a graph showing frequency characteristics of component circuits incorporated in the communication system.

FIG. 10 shows the frequency characteristics of the communication system. The transmitting circuit 1 exhibits the frequency characteristics (a) to the input digital signal S1 at the output node thereof. Although the output characteristics of the transmitting circuit 1 have peaks at the signal frequency f0 and frequencies at odd times, the signal frequency f0 and the vicinity thereof are indicated by the abscissa, and only the peak at the signal frequency f0 is shown in the graph. The transmission line 2 exhibits the frequency transfer characteristics (b). When the transmitting circuit 1 outputs the signal S2 to the transmission line 2, the transmitting signal S2 exhibits the frequency characteristics (c) at the end of the transmission line 2. In order to make the signal S3 exhibit the flat frequency characteristics, i.e., a constant frequency dependency, the frequency characteristics (d) are required for the equalizer 7. Since the equalizer of the transmitting circuit 1 is of the circuit processing the input signal in a bit-to-bit manner, the data processing speed is constant regardless of the amplification factor. On the other hand, when a large amplification factor is required for the equalizer 7, the equalizer 7 introduces a long time delay into the signal S3. This means that the amplification on the high frequency signal components is difficult. In order to cope with the difficulty, the communication system implementing the first embodiment includes the equalizer for the transmitting circuit 1 and the equalizer 7 for the receiving circuit 3, and the transmitting circuit 1 and receiving circuit 3 are designed in such a manner that the equalizers thereof exhibit the characteristics complementary to one another. This means that the amplification to be required is shared between the equalizer for the transmitting circuit 1 and the equalizer 7 for the receiving circuit 3. In other words, the equalizer 7 is merely expected to achieve a part of the amplification to be required for the high frequency signal components. This results in that the signal components to be driven by the equalizer 7 are widened, and the communication system is improved in the transmission rate.

As will be understood, the equalizer 7 compensates the attenuation along the transmission line 2, and the equalizers on both sides of the transmission line 2 restore the received signal to the waveform close to the original waveform.

Second Embodiment

Figure 11:
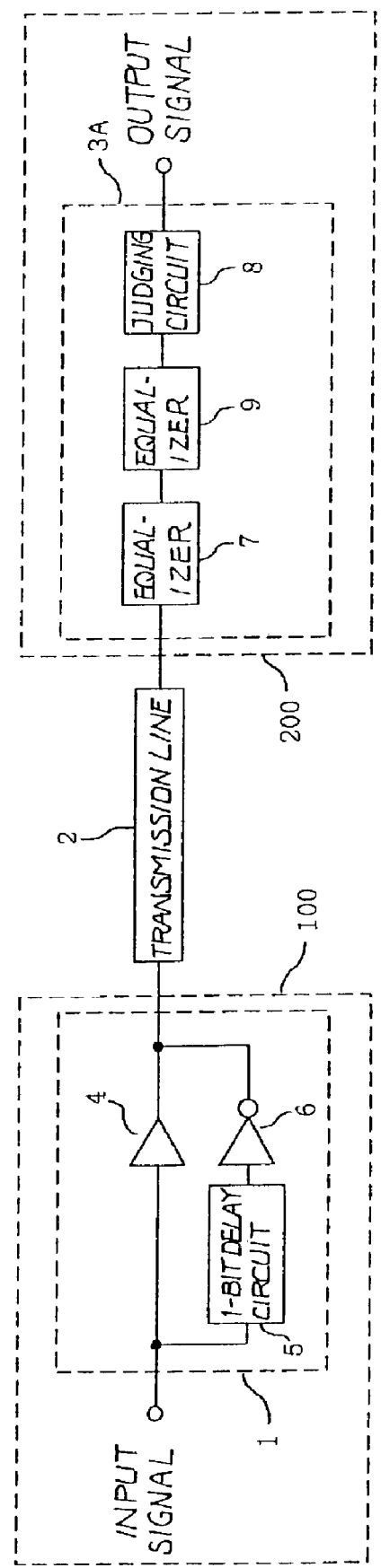
FIG. 11 is a block diagram showing the system configuration of another communication system according to the present invention.

FIG. 11 shows another communication system embodying the present invention. The communication system shown in FIG. 11 is similar to the communication system shown in FIG. 9 except a receiving circuit 3A. For this reason, system components are labeled with the references designating the corresponding components of the communication system implementing the first embodiment without detailed description for the sake of simplicity.

The receiving circuit 3A includes the equalizer 7 and another equalizer 9. The equalizer 9 is connected between the equalizer 7 and the judging circuit 8 so that the received signal is equalized through the equalizers 7 and 9. The equalizer 9 is expected to amplify signal components higher in frequency than the signal frequency.

Figure 12:
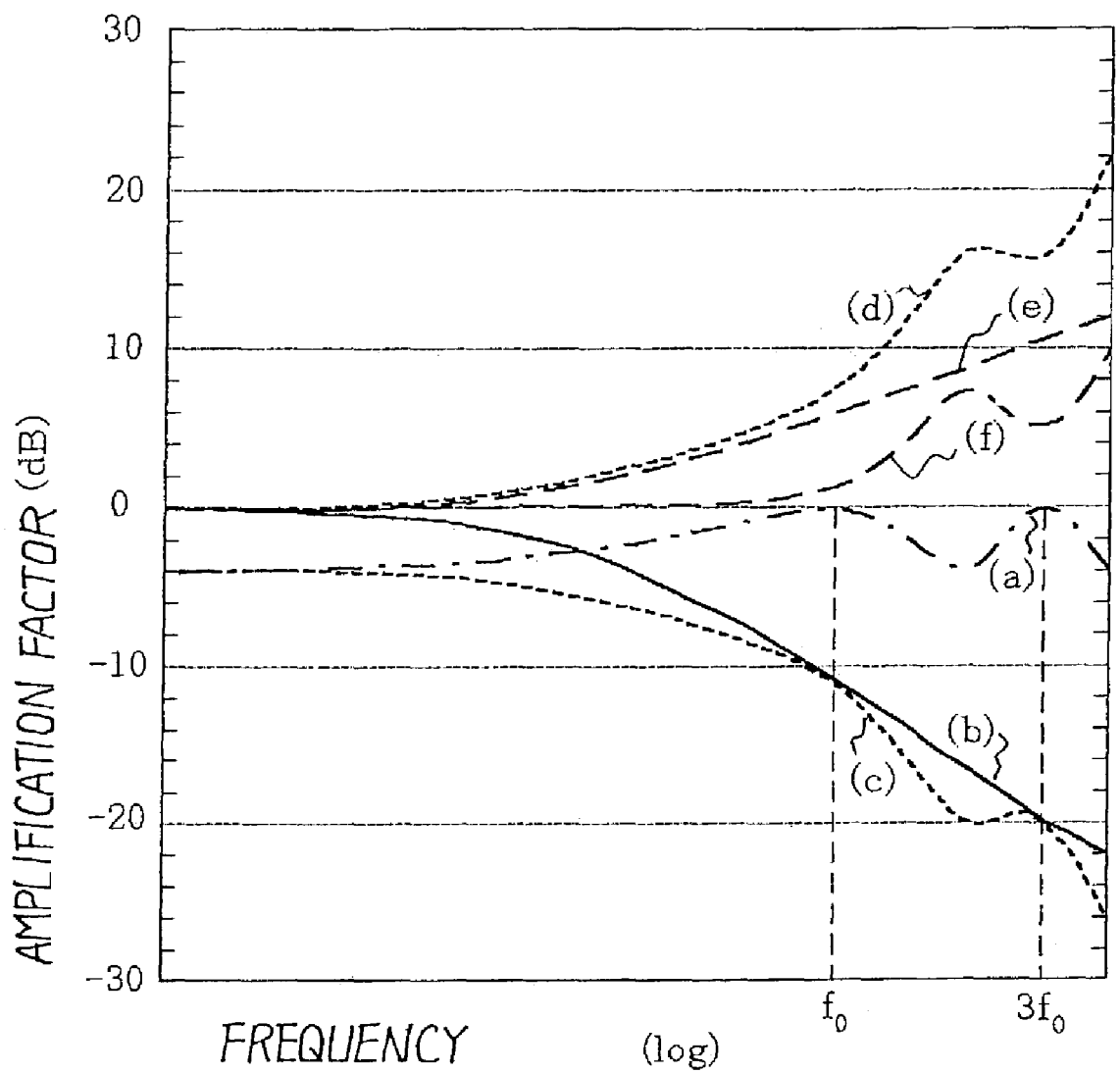
FIG. 12 is a graph showing frequency characteristics of component circuits incorporated in the communication system.

FIG. 12 shows frequency characteristics of the system components. The signal frequency f0 and the frequency 3f0 three times higher than the signal frequency is on the abscissa. Plots (a) are representative of the frequency characteristics of the equalizer incorporated in the transmitting circuit 1, and the amplification factor is peaked at the signal frequency f0 and frequency 3f0. However, the amplification factor at the frequency 3f0 is as larger as that at the signal frequency f0. Thus, the equalizer for the transmitting circuit 1 does not exhibit the amplification factor larger than the amplification factor at the signal frequency f0. This means that the equalizer for the transmitting circuit 1 does not carry out the equalization in the band higher than the signal frequency f0. Plots (b) are representative of the frequency characteristics of the transmission line 2. While the transmitting signal is being propagated through the transmission line 2, the signal components of the transmitting signal are unevenly attenuated so that the transmitting signal has the frequency characteristics (c) at the end of the transmission line 2. The signal components over the signal frequency f0 are widely attenuated. It is possible to equalize the received signal with the frequency characteristics (c) through the single equalizer 7 before judging the logic level of the bits. However, the equalization over the signal frequency f0 makes the margin at the judging circuit 8 large. For this reason, the equalizer 9 is connected between the equalizer 7 and the judging circuit 8. It is difficult to expect a single equalizer to equalize the received signal on both sides of the signal frequency f0, because the equalizer for the transmitting circuit I carried out the equalization for only the signal components equal to or less than the signal frequency f0.

In the second embodiment, the receiving circuit 3 includes not only the equalizer 7 equivalent to the equalizer 7 of the first embodiment but also the equalizer 9. The equalizer 9 is expected to equalize the received signal in the band over the signal frequency f0. The waveform of the received signal is closer to the original waveform by virtue of the equalizer 9.

The frequency characteristics to be required are represented by plots (d). The equalizer 7 exhibits the frequency characteristics (e) corresponding to the frequency characteristics (d) in FIG. 10. Comparing plots (d) with plots (e), it is understood that the difference is serious over the signal frequency f0. In order to compensate the difference of the amplification factor, the equalizer 9 is designed to exhibit the frequency characteristics (f). The frequency characteristics (f) are equivalent to the difference between the frequency characteristics (d) and the frequency characteristics (e). Since the equalizer 9 is expected to amplify the signal components in the band over the signal frequency f0, the amplification factor is nearly equal to zero in the band lower than the signal frequency f0.

As will be understood, the equalizer 9 compensates the attenuation of the signal components in the band over the signal frequency f0, and the equalizers on both sides of the transmission line 2 restore the received signal to the waveform closer to the original waveform than the waveform of the received signal in the first embodiment.

Third Embodiment

Figure 13:
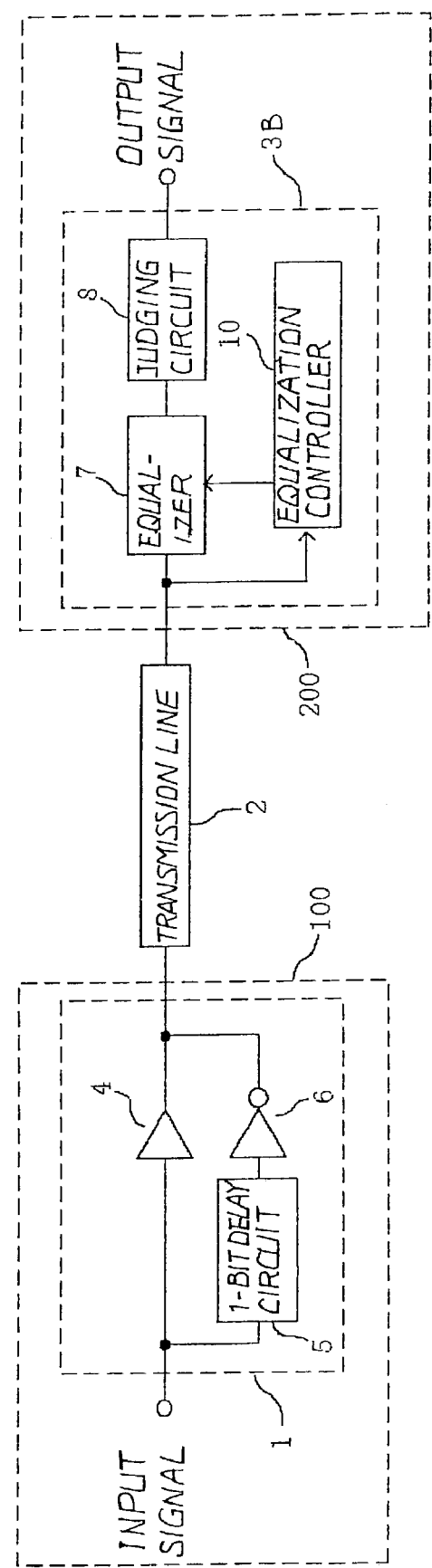
FIG. 13 is a block diagram showing the system configuration of yet another communication system according to the present invention.

FIG. 13 shows yet another communication system embodying the present invention. The communication system shown in FIG. 13 is similar to the communication system shown in FIG. 9 except a receiving circuit 3B. For this reason, the system components are labeled with the references designating the corresponding components of the communication system implementing the first embodiment without detailed description for the sake of simplicity.

The receiving circuit 3B includes the equalizer 7, judging circuit and an equalization controller 10. The equalization controller 10 investigates the frequency characteristics of the transmission line 2, and controls the equalizer 7 to optimize its equalization.

In case where the frequency characteristics of the transmission line 2 are known to the manufacturer, it is possible to optimize the equalizer 7 before the delivery. However, if the users have the option, it is preferable to optimize the equalizer 7 on the user's side. The equalization controller 10 permits the user to optimize the equalizer 7 depending upon the frequency characteristics of the transmission line 2.

Even though the frequency characteristics of the transmission line 2 are known to the manufacturer, the environment and/or aged deterioration has an influence on the frequency characteristics of the transmission line 2. If the transmission line 2 is put in the environment seriously varied, the equalization controller 10 is effective against the environment. In case where the transmission line 2 is expected to transmit the signal for a long time without any repair, the equalization controller 10 is also effective against the aged deterioration.

The communication system implementing the third embodiment achieves all the advantages of the first embodiment, and the equalization controller 10 enhances the stability to the communication system.

Fourth Embodiment

Figure 14:
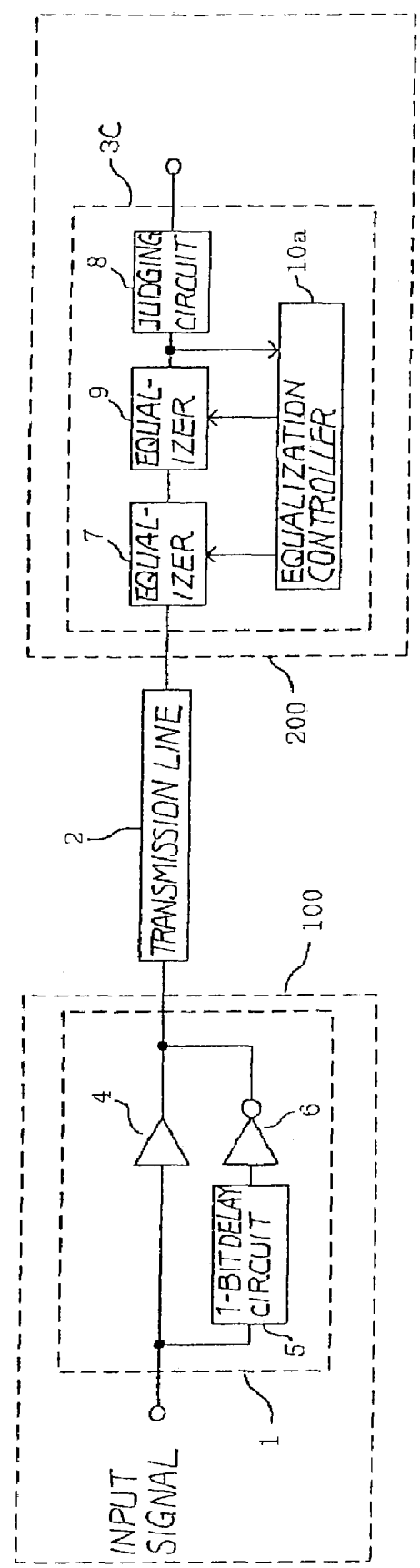
FIG. 14 is a block diagram showing the system configuration of still another communication system according to the present invention.

FIG. 14 shows still another communication system embodying the present invention. The communication system shown in FIG. 13 is similar to the communication system shown in FIG. 9 except a receiving circuit 3C. For this reason, the system components are labeled with the references designating the corresponding components of the communication system implementing the first embodiment without detailed description for the sake of simplicity.

The receiving circuit 3C includes the equalizers 7/9, judging circuit 8 and equalization controller 10a. The equalizers 7 and 9 behave as similar to those of the receiving circuit 3A. The equalization controller 10a monitors the output signal of the equalizer 9, and controls the equalizers 7 and 9 to make the frequency characteristics of the output signal flat. The output signal of the equalizer 9 is restored to a waveform substantially identical with the original waveform. The judging circuit 9 exactly discriminates the bits of one logic level from the bits of the opposite logic level.

EXAMPLES

Figure 15:
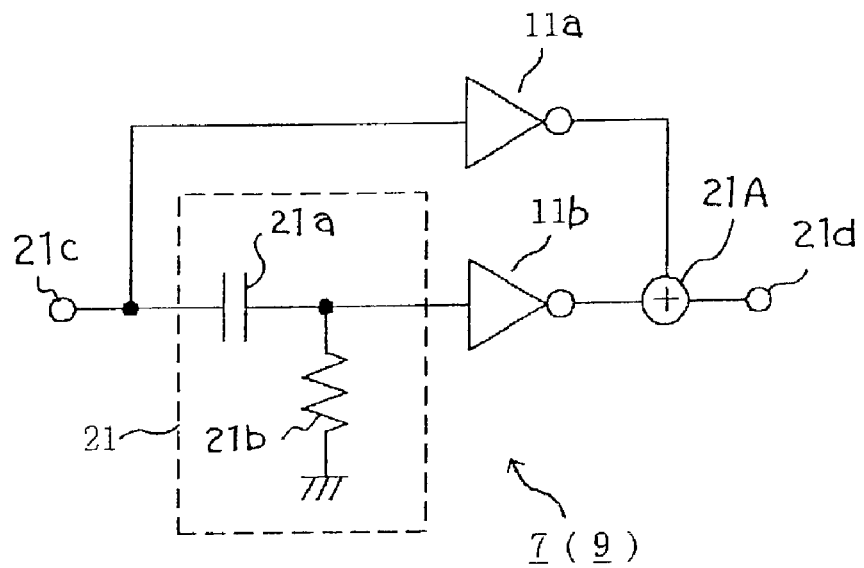
FIG. 15 is a circuit diagram showing the circuit configuration of an equalizer incorporated in the communication systems according to the present invention.
Figure 16:
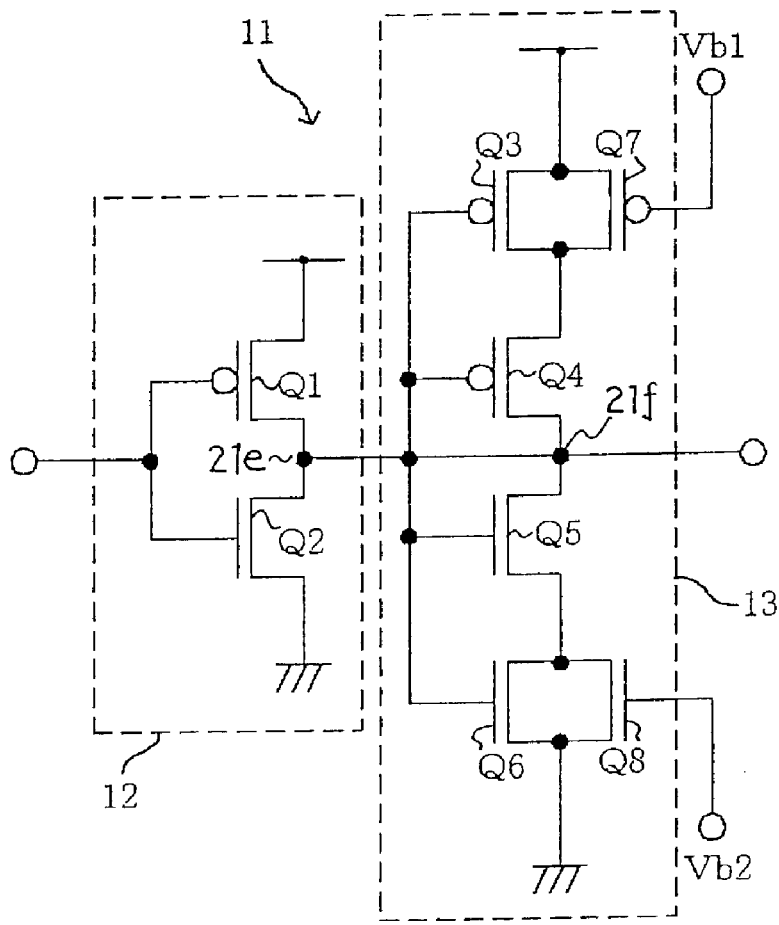
FIG. 16 is a circuit diagram showing the circuit configuration of an inverting amplifier incorporated in the equalizer according to the present invention.

FIG. 15 shows a circuit configuration of the equalizer 7/9 incorporated in the receiving circuits 3/3A/3B/3C. The equalizer 7/9 is implemented by CMOS inverters so as to carry out the equalization at a high speed. The equalizer 7/9 includes inverting amplifiers 11a/11b, a high pass filter 21 and an adding means 21A. The high pass filter 21 includes a condenser 21a and a resistor 21b. The inverting amplifier 11a is connected at the input node thereof to a signal input node 21c and at the output node thereof to an input node of the adding means 21A. The condenser 21a is connected between the signal input node 21c and an input node of the other inverting amplifier 11b, and the resistor 21b is connected between the input node of the inverting amplifier 11b and the ground. The output node of the inverting amplifier 11b is connected to the other input node of the adding means 21A, and the output node of the adding means 21A is connected to the signal output node 21d.

Each of the inverting amplifiers 11a/11b includes an amplification stage 12 and a gain controlling stage 13. The amplification stage 12 is implemented by a CMOS inverter, i.e., a series combination of a p-channel enhancement type field effect transistor Q1 and an n-channel enhancement type field effect transistor Q2. The series combination of the p-channel enhancement type field effect transistor Q1 and the n-channel enhancement type field effect transistor Q2 is connected between a positive power voltage line and the ground, and the input signal is supplied to the gate electrode of the p-channel enhancement type field effect transistor Q1 and the gate electrode of the n-channel enhancement type field effect transistor Q2. The amplification stage 12 amplifies the input signal at a large gain, and supplies an output signal from the common drain node 21e to the gain controlling stage 13

The gain controlling stage 13 includes a series combination of p-channel enhancement type field effect transistors Q3 and Q4, another series combination of n-channel enhancement type field effect transistors Q5 and Q6, a p-channel enhancement type field effect transistor Q7 and an n-channel enhancement type field effect transistor Q8. The series combination of p-channel enhancement type field effect transistors Q3 and Q4 is connected between the positive power voltage line and a common drain node 21f, which is connected to the common drain node 21e of the amplification stage 12. The other series combination of n-channel enhancement type field effect transistors Q5 and Q6 is connected between the common drain node 21f and the ground, and the p-channel enhancement type field effect transistor Q7 and n-channel enhancement type field effect transistor Q8 are connected in parallel to the p-channel enhancement type field effect transistor Q3 and n-channel enhancement type field effect transistor Q6, respectively. The output signal is supplied from the common drain node 21e to the gate electrodes of the p-channel enhancement type field effect transistors Q3/Q4 and the gate electrodes of the n-channel enhancement type field effect transistors Q5/Q6, and control voltages Vb1 and Vb2 are supplied to the gate electrode of the p-channel enhancement type field effect transistor Q7 and the gate electrode of the n-channel enhancement type field effect transistor Q8, respectively.

Figure 17:
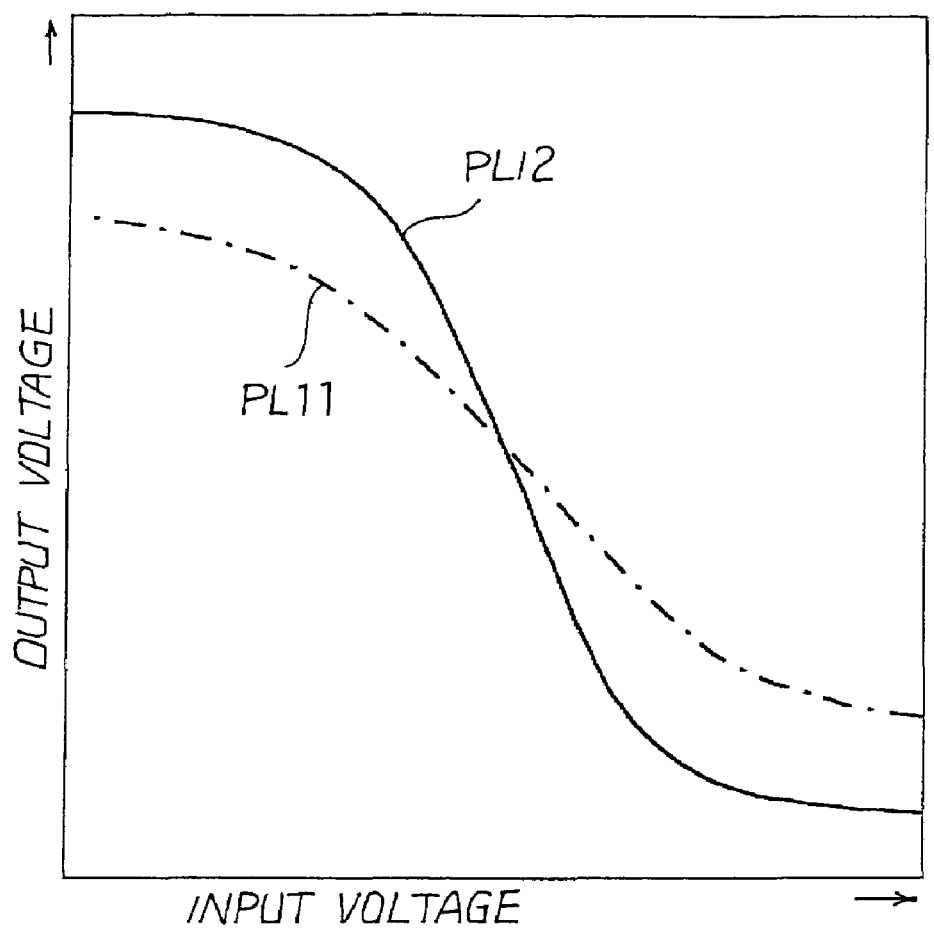
FIG. 17 is a graph showing the input-to-output characteristics of the equalizer.

The gain controlling stage 13 partially cancels the amplification at the amplification stage 12. FIG. 17 shows the input voltage-to-output voltage characteristics of the equalizer 7/9. The total gain of the equalizer 7/9 is varied by changing the control voltages Vb1/Vb2. Plots PL11 are indicative of the input voltage-to-output voltage characteristics at a relatively small gain, and plots PL12 are indicative of the input voltage-to-output voltage characteristics at a relatively large gain. When the control voltages Vb1/Vb2 are varied, the gain controlling stage 13 changes the gradient of the plots. In case where the equalization controller 10/11a is provided for the equalizer 7 or equalizers 7/9, the control voltages Vb1/Vb2 are supplied from the equalization controller 10/10a to the gain controlling stage 13.

Figure 1:
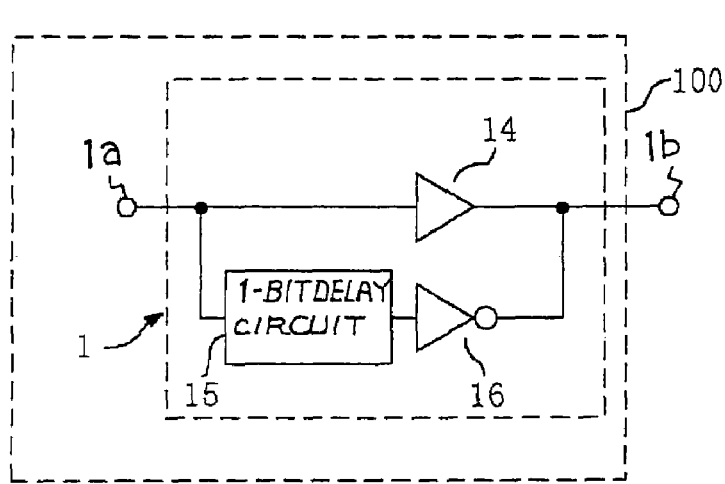
FIG. 1A is a circuit diagram showing the circuit configuration of the prior art equalizer for the transmitter.
FIG. 1B is a diagram showing the waveform of the output signal of the prior art equalizer.
Figure 1:
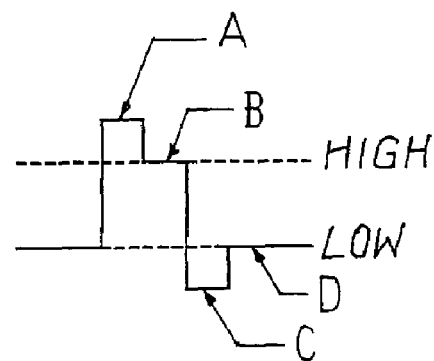
Figure 5:
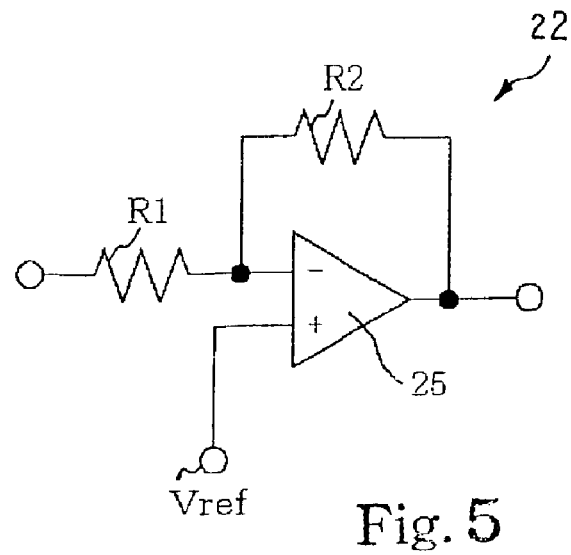
FIG. 5 is a circuit diagram showing the circuit configuration of the amplifier incorporated in the prior art equalizer.
Figure 6:
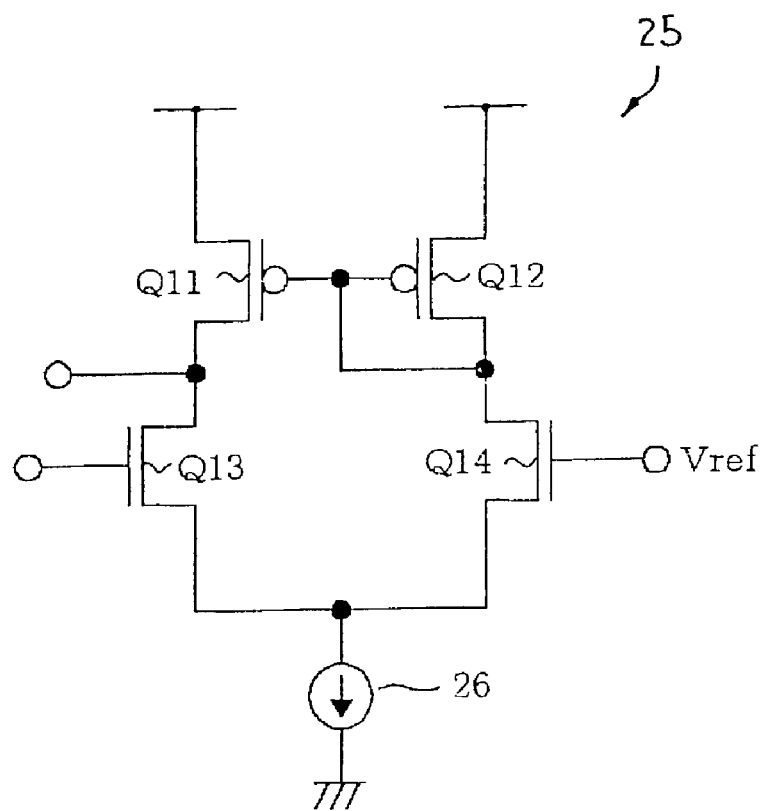
FIG. 6 is a circuit diagram showing the circuit configuration of the operational amplifier incorporated in the prior art amplifier.
Figure 7:
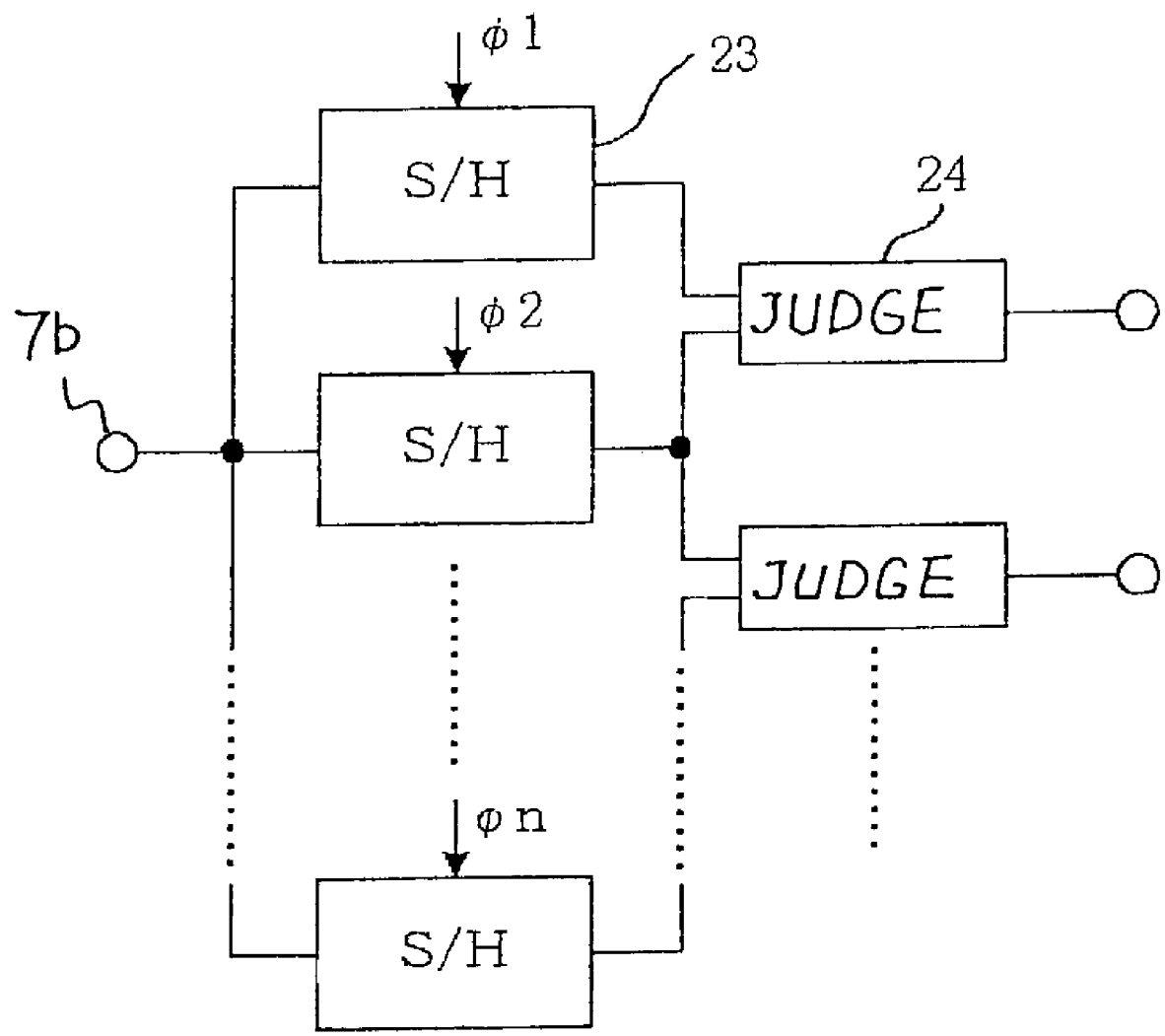
FIG. 7 is a block diagram showing the circuit configuration of the array of the sample-and-hold circuits.
Figure 8:
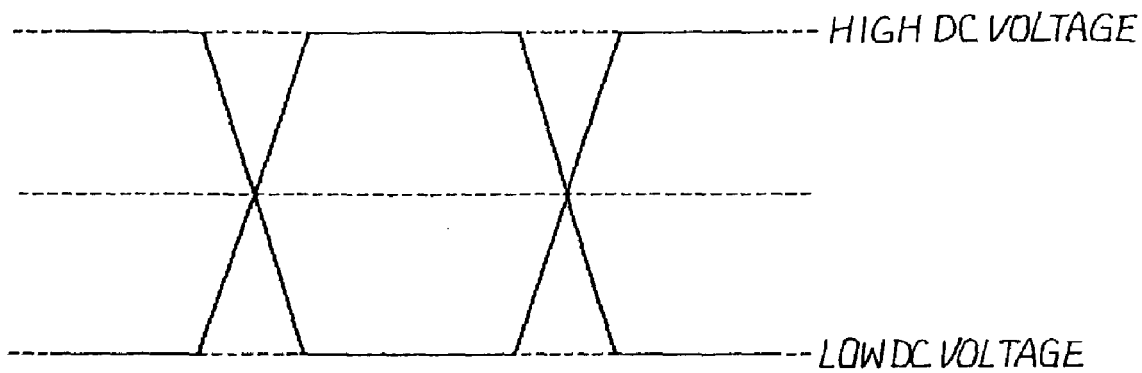
FIGS. 8A to 8C are diagrams showing the waveforms of the equalized signals transmitted along the different transmission lines.
Figure 8:
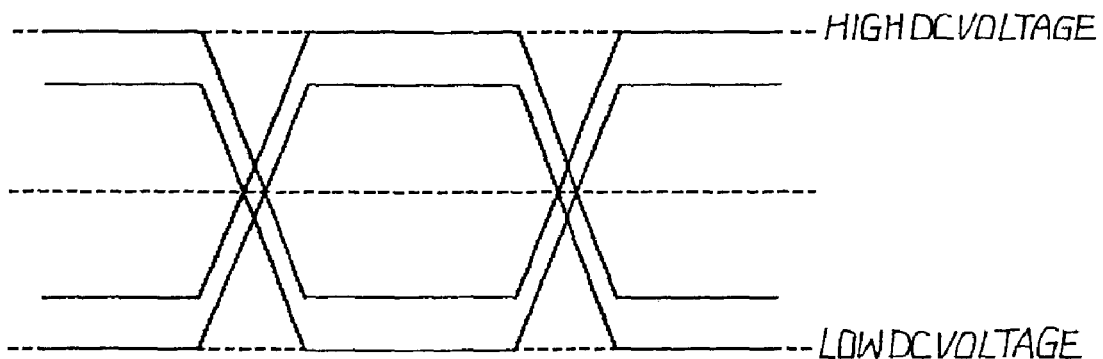
Figure 8:
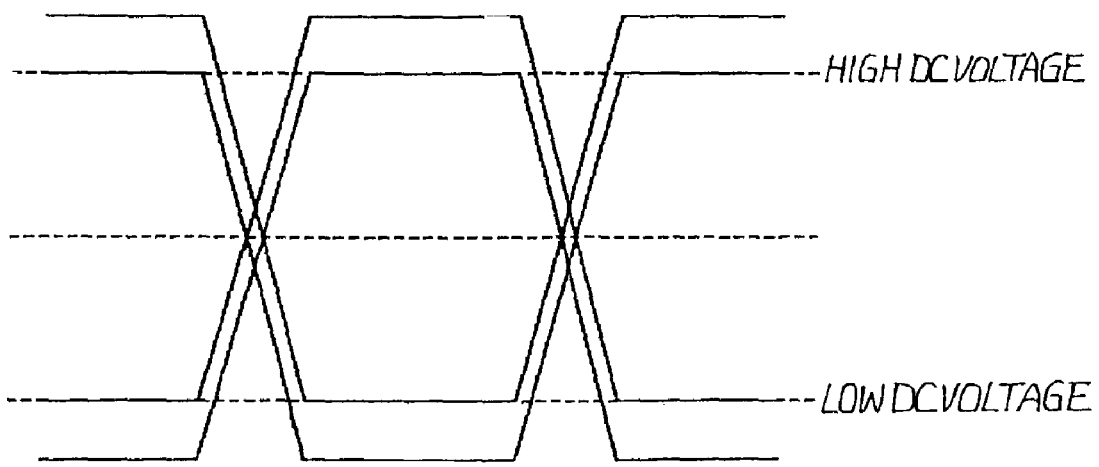

The equalizers 7/9 are designed to achieve the gain equal to or less than 1, or equal to or greater than 1. When the gain of each amplifier is adjusted to an optimum value, the signal and its high frequency components are added at a proper ratio in a wide range. The differential amplifier was mainly used for the prior art circuit as shown in FIGS. 5 and 6. The constant current source 26 of the differential amplifier occupied wide real estate on the semiconductor chip. Moreover, the input voltage range of the differential amplifier is narrow. A differential amplifier implemented by p-channel field effect transistors may be provided in parallel to another differential amplifier in order to make the input voltage range wide. However, extremely wide real estate is required for the two differential amplifiers.

On the other hand, the inverting amplifiers 11a/11b are implemented by the CMOS transistors so as to widen the input voltage range. Moreover, the amount of real estate occupied is reduced. Since the inverting amplifiers 11a/11b does not have any constant current source, the differential voltage between gate and the source in the amplification stage is larger than that of the differential amplifier. For this reason, the amplification stage has a large current driving capability, and causes the next state to operate at a high speed. Another advantage over the linear amplifier with the differential type operational amplifier is reduction in delay time due to the resistor and the parasitic gate capacitance, because the inverting amplifier does not require any feed-back through the resistor.

As will be appreciated from the foregoing description, the communication system according to the present invention achieves a high-speed high-quality data transmission by virtue of the equalizers respectively incorporated in the transmitting circuit and receiving circuit.

Although particular embodiments of the present invention have been shown and described, it will be apparent to those skilled in the art that various changes and modifications may be made without departing from the spirit and scope of the present invention.

What is claimed is:

1. A communication system comprising
   a first device including a circuitry for generating a first digital signal at a signal frequency and a transmitting circuit connected to said circuitry and having a first equalizer for producing a transmitting signal containing high frequency signal components over said signal frequency;
   a transmission line connected at one end thereof to said transmitting circuit for propagating said transmitting signal to the other end thereof, and causing said high frequency signal components to be attenuated more seriously than a signal component at said signal frequency; and
   a second device including a receiving circuit having a second equalizer connected to said other end of said transmission line and amplifying at least said high frequency signal components for restoring said transmitting signal to a waveform close to an original waveform of said first digital signal, a judging circuit for producing a second digital signal from parts of said waveform, and an equalization controller connected to said second equalizer for automatically optimizing the total amount of equalization carried out by both of said first and second equalizers, said second equalizer includes a first amplifier supplied with said transmitting signal, a high pass filter supplied with said transmitting signal, a second amplifier supplied with an output signal of said high pass filter and an adder supplied with output signals of said first and second amplifiers for imparting said waveform to said transmitting signal, each of said first and second amplifiers has an amplification stage implemented by CMOS inverters and a gain controlling stage connected to said amplification stage and implemented by CMOS components, said gain controlling stage has a series combination of first and second p-channel enhancement type field effect transistors connected between a first source of constant voltage and a common drain node, a series combination of first and second n-channel enhancement type field effect transistors connected between said common drain node and a second source of constant voltage different in potential level from said first source of constant voltage, a p-channel enhancement type field effect transistor connected in parallel to the first p-channel enhancement type field effect transistor and having a gate electrode applied with a first control voltage and an n-channel enhancement type field effect transistor connected in parallel to the second n-channel enhancement type field effect transistor and having a gate electrode applied with a second control voltage, and an output signal of said amplification stage is supplied to gate electrodes of said first and second p-channel enhancement type field effect transistors and gate electrodes of said first and second n-channel enhancement type field effect transistors.

2. The communication system as set forth in claim 1, in which said first and second control voltages are variable.

3. The communication system as set forth in claim 2, in which said receiving circuit further has an equalization controller monitoring said transmission signal at said other end of said transmission line for determining frequency characteristics of said transmission line and producing said first and second control voltages on the basis of said frequency characteristics of said transmission line for supplying said first and second control voltages to said gain controlling stage.

4. A communication system comprising
a first device including a circuitry for generating a first digital signal at a signal frequency and a transmitting circuit connected to said circuitry and having a first equalizer for producing a transmitting signal containing high frequency signal components over said signal frequency;
a transmission line connected at one end thereof to said transmitting circuit for propagating said transmitting signal to the other end thereof, and causing said high frequency signal components to be attenuated more seriously than a signal component at said signal frequency; and
a second device including a receiving circuit having a second equalizer connected to said other end of said transmission line and amplifying at least said high frequency signal components for restoring said transmitting signal to a waveform close to an original waveform of said first digital signal, a judging circuit for producing a second digital signal from parts of said waveform, a third equalizer connected between said second equalizer and said judging circuit and carrying out an equalization in a band different from that of said second equalizer, and an equalization controller connected to said second equalizer for automatically optimizing the total amount of equalization carried out by both of said first and second equalizers, each of said second and third equalizers includes a first amplifier supplied with said transmitting signal, a high pass filter supplied with said transmitting signal, a second amplifier supplied with an output signal of said high pass filter and an adder supplied with output signals of said first and second amplifiers for imparting said waveform to said transmitting signal, each of said first and second amplifiers has an amplification stage implemented by CMOS inverters and a gain controlling stage connected to said amplification stage and implemented by CMOS components, said gain controlling stage has a series combination of first and second p-channel enhancement type field effect transistors connected between a first source of constant voltage and a common drain node, a series combination of first and second n-channel enhancement type field effect transistors connected between said common drain node and a second source of constant voltage different in potential level from said first source of constant voltage, a p-channel enhancement type field effect transistor connected in parallel to the first p-channel enhancement type field effect transistor and having a gate electrode applied with a first control voltage and an n-channel enhancement type field effect transistor connected in parallel to the second n-channel enhancement type field effect transistor and having a gate electrode applied with a second control voltage, and an output signal of said amplification stage is supplied to gate electrodes of said first and second p-channel enhancement type field effect transistors and gate electrodes of said first and second n-channel enhancement type field effect transistors.

5. The communication system as set forth in claim 4, in which said first and second control voltages are variable.

6. The communication system as set forth in claim 5, in which said receiving circuit further has an equalization controller monitoring an output signal of said third equalizer for determining frequency characteristics of said transmission line and producing said first and second control voltages on the basis of said frequency characteristics of said transmission line for supplying said first and second control voltages to the gain controlling stages respectively incorporated in said second and third equalizers.

* * * * *